United States Patent [19]

Sollami

[11] Patent Number: 4,656,925

[45] Date of Patent: Apr. 14, 1987

[54] FACE SEAL

[76] Inventor: Phillip A. Sollami, 1300 E. Pine, Herrin, Ill. 62948

[21] Appl. No.: 694,509

[22] Filed: Jan. 24, 1985

[51] Int. Cl.$^4$ .............................................. F01C 9/00
[52] U.S. Cl. ........................................ 92/125; 92/128; 277/84; 277/95; 277/165
[58] Field of Search ................. 92/121, 122, 123, 124, 92/125, 128; 277/165, 84, 95, 188 A; 91/167 A

[56] References Cited

U.S. PATENT DOCUMENTS

| | | | |
|---|---|---|---|
| 3,128,679 | 4/1964 | Trendle | 92/125 |
| 3,195,421 | 7/1965 | Rumsey et al. | 92/125 |
| 3,215,046 | 11/1965 | Drake | 92/125 |
| 3,277,796 | 10/1966 | Wessel | 92/128 |
| 3,359,871 | 12/1967 | Kamman | 92/121 |
| 3,426,654 | 2/1969 | Laughman | 92/125 |
| 3,455,563 | 7/1969 | Gies et al. | 277/165 |
| 3,750,535 | 8/1973 | Higuchi | 92/121 |
| 4,493,245 | 1/1985 | Kirsch et al. | 92/121 |
| 4,495,856 | 1/1985 | Sollami | 92/125 |

FOREIGN PATENT DOCUMENTS 1298763  6/1962  France ................................ 92/121

Primary Examiner—Abraham Hershkovitz
Attorney, Agent, or Firm—Edmond T. Patnaude

[57] ABSTRACT

A face seal between the rotor and stator of a fluid-operated rotory motor is formed by a seal member formed of a low friction material having a low surface coefficient of friction and a low memory and extruded into sealing engagement with an associated part by an elastomeric seal member as the rotor and stator are assembled.

5 Claims, 7 Drawing Figures

FACE SEAL

The present invention relates in general to face seals adapted for use in fluid-operated rotary motors in which a high pressure seal between the interface of two rotating parts must be maintained, and it relates to a new and improved rotary motor including new and improved face seals between the rotor and the heads of the motor.

BACKGROUND OF THE INVENTION

Oscillatory rotary actuators employing radial vanes mounted on a stator and on a shaft are well known. See, for example, U. S. Pat. Nos. 3,128,679, 3,131,610 and 3,215,046 wherein three such devices are described. Also in my co-pending application Ser. No. 06/548,950, filed Nov. 7, 1983, now U.S. Pat. No. 4,495,856, there is described an improved rotary actuator having durable seals and improved thrust bearings for preventing axial movement of the shafts.

In the past the rotors of fluid-operated rotary actuators have been sealed to the heads by O-rings, quad-seals or the like formed of an elastomeric material, such as rubber, and U-shaped resilient sealing gaskets formed of rubber or the like mounted in complimentary grooves in the vanes of the stator and the rotor. This construction had the disadvantage of a relatively short seal life because of the fact that one rubber seal rubbed against the other. It would be desirable, therefore, to replace one of the elastomeric seals with a less abrasive material such, for example, as tetrofluroethylene.

SUMMARY OF THE INVENTION

Briefly, there is provided in accordance with a preferred embodiment of the present invention a new and improved seal between a rotor and a stator. The improved seal includes an annular elastomeric member compressed between an annular, rigid seal member and the rotor to press the seal member into sealing contact with the stator. The sealing member is formed of a material having a low coefficient of friction and little or no memory. One such material is tetrofluroethylene and another is a mixture of tetrofluroethylene, carbon and molydisulfide.

In accordance with the teachings of this invention, the force exerted on the seal member during assembly of the rotor to the stator must exceed the compressive strength of the material of which the seal member is formed thereby causing the surface of the seal which abuts the stator to conform to the shape of the abutting surface of the stator.

In accordance with another important aspect of the present invention, the seal member and the stator are initially shaped to provide an annular space adjacent to their initially abutting surfaces to permit the seal member to extrude into the annular space rather than to extrude in the opposite direction and thereby form a thin knife-like edge as the rotor and stator are pressed together during mutual assembly thereof.

GENERAL DESCRIPTION OF THE DRAWINGS

The present invention will be better understood by a reading of the following detailed description taken in connection with the accompanying drawings wherein.

DETAILED DESCRIPTION OF A PREFERRED EMBODIMENT OF THE INVENTION

Figure 1:
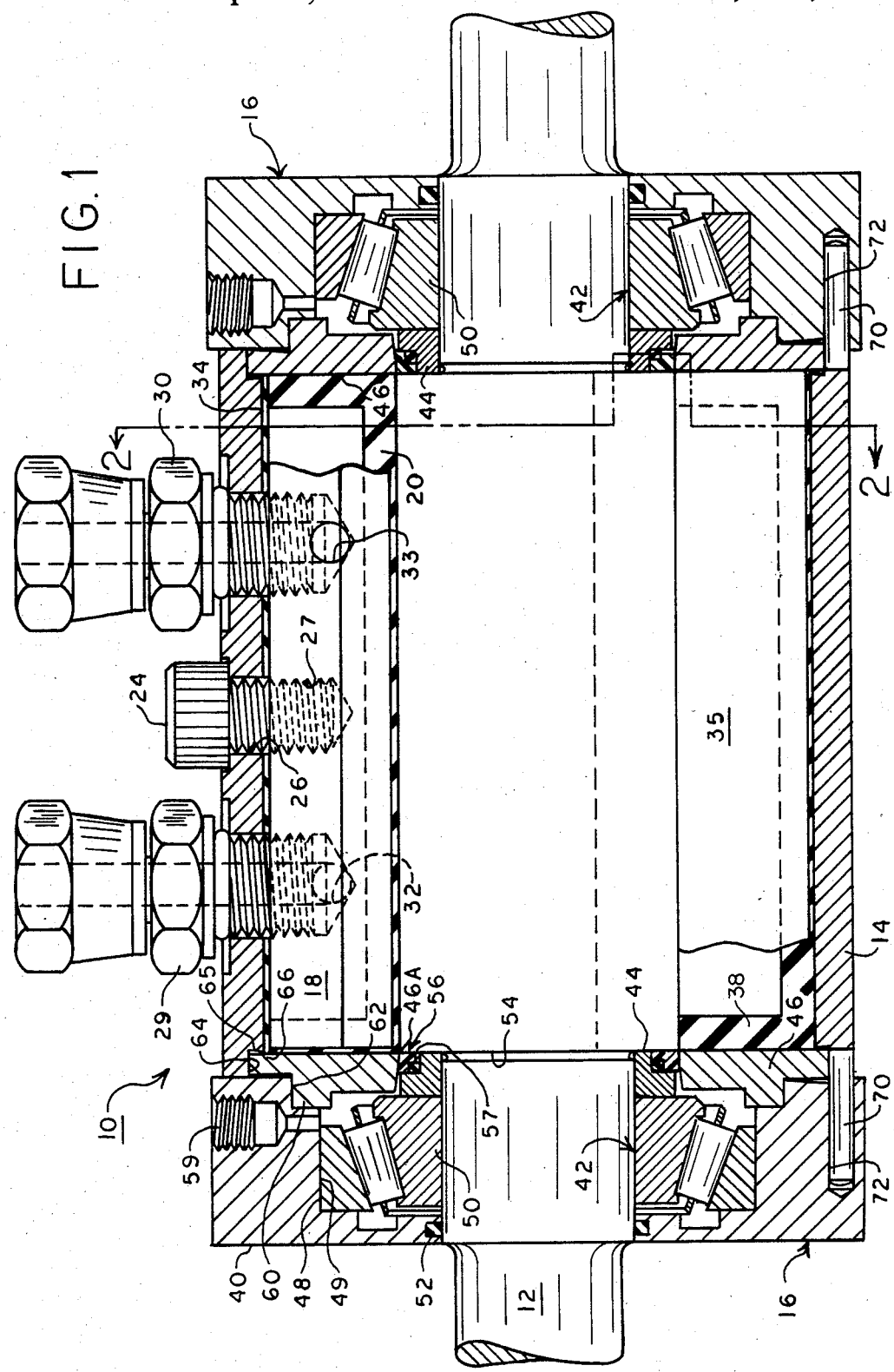
FIG. 1 is a longitudinal cross-sectional view of a rotary actuator embodying the present invention.
Figure 2:
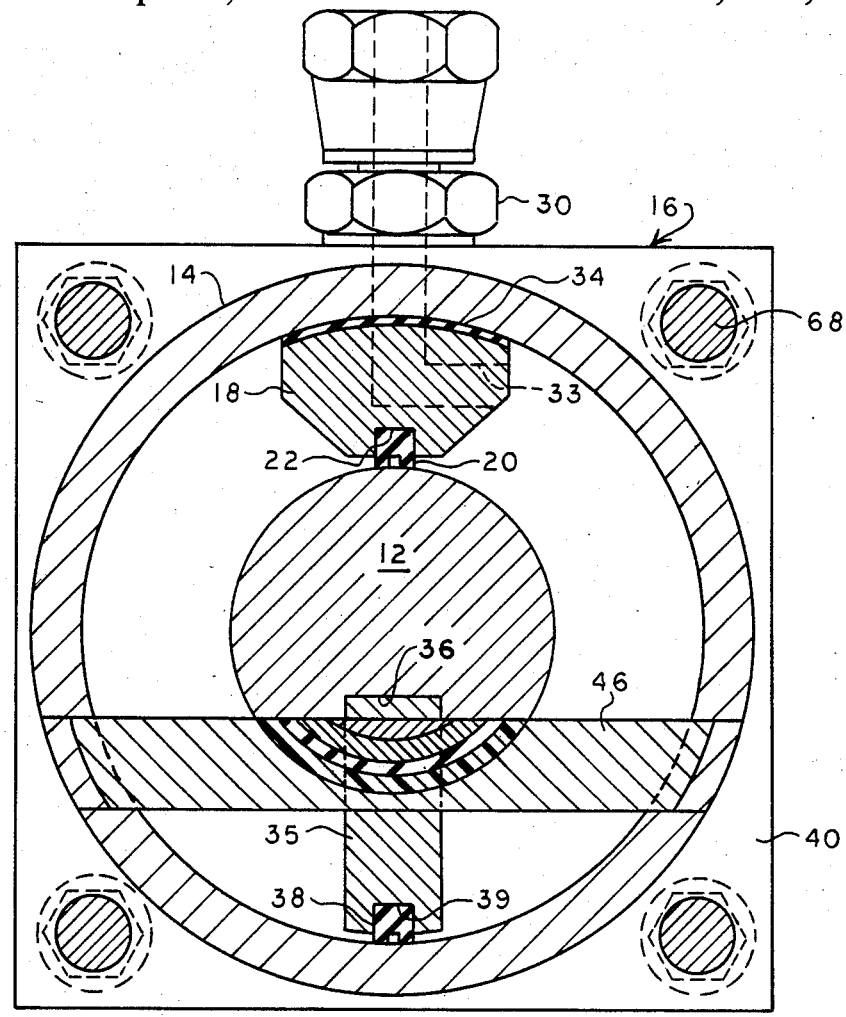
FIG. 2 is a cross-sectional view taken along line 2—2 of FIG. 1, assuming the entire actuator to be shown in FIG. 1.

Referring to FIG. 1, a fluid operated reciprocatory rotary motor 10 may be seen to include a drive shaft 12 journaled for rotation in a generally cylindrical housing made up of a tubular body member or sleeve 14 to the respective ends of which a pair of identical head assemblies 16 are fixedly and sealably connected. A stator 18 is sealably mounted against the inner side of the body sleeve 14 and is sealed at its respective ends to the head assemblies 16 by a resilient, U-shaped sealing gasket 20. The gasket 20 is mounted in a U-shaped groove 22 in the stator 18 with the intermediate, longitudinally extending portion sealably engaging the shaft 12 in the manner best shown in FIG. 2. A machine screw 24 has its shank extending through a hole 26 in the body sleeve 14 and is threaded into a blind hole 27 in the stator 18 to lock the stator at a fixed position within the body sleeve 14. In addition, the stator 18 is held in place by means of a pair of fluid inlet/outlet fittings 29 and 30 which are threaded into the stator 18 and respectively communicate with transverse passageways 32 and 33 respectively opening onto opposite sides of the stator 18. The fittings 29 and 30 are shown prior to their being tightened into the stator 18 to compress a pair of O-ring gaskets. As shown, the stator 18 is sealed to the body sleeve 14 by a gasket 34.

A radial vane 35 is affixed to the shaft 12 and extends from one head assembly to the other so as to rotate the shaft in one angular direction or the other in response to the flow of fluid from either the passageway 32 or the passageway 33 in the stator 18. Considered in greater detail, the vane 35 is mounted in a slot 36 in the shaft 12, and a resilient, U-shaped sealing gasket 38 is mounted in a U-shaped groove 39 in the vane 35 to seal the vane to the head assemblies 16 and to the inner wall of the body sleeve 14.

The head assemblies 16 are identical and each annular thrust bearing 42, an annular thrust bushing 44 and an annular face plate 46. The thrust bearing 42 is preferably a tapered roller bearing having an outer race 48 pressed into a generally cylindrical recess 49 in the inner face of the head member 40. The inner race 50 is slip fitted on the shaft 12. However, other types of radial and thrust bearings, alone or in combination, could be used in place of the tapered bearing 42.

An annular sealing gasket 52 is mounted in an annular groove in the head member 40 and is compressed against the shaft 12 to seal the head member 40 to the shaft 12. The thrust bushing 44 is tightly fitted between the inner race 50 and an annular shoulder 54 on the shaft 12 so as to rotate with the shaft, and an annular gasket assembly 56 is disposed in an annular groove 57 in the thrust bushing 44 in sealing relationship with the inner circular wall 46A of the head plate 46 and in sealing relationship with the thrust bushing 44 to seal the plate 46 to the thrust bushing 44 and thus seal the chamber within the body sleeve 14 from the ambient.

The thrust bearing 42 is of conventional construction and is lubricated through a port 59 in which a suitable fitting is adapted to be mounted for connecting a conventional lubricating system to the bearing 42. The port 59 may also be used as a return-to-tank connection for hydraulic applications.

The end plate 46 includes on its inner face an annular locating flange 60 which fits into an annular counterbore 62 in the head member 40. The outer portion of the plate 46 extends into an annular groove 64 provided in the inner edge of the body sleeve 14. As shown, the wall 65 of the groove 64 is undercut to provide a raised annular edge 66 providing substantially line contact between the inner face of the end plate 46 and the body sleeve 14 when the head members are pressed toward one another by means of four nut and bolt assemblies 68. These bolts extend along the outside of the sleeve 14 through respective holes near the corners of the head members 40. The flange 60 is displaced radially from the edge 66 so that as the bolts are tightened, the raised annular edge 66 first engages the end plate, and the plate 46 is then flexed to provide a hermetic metal-to-metal seal between the head assembly and the body sleeve 14.

A pair of locating and locking pins 70 are positioned in blind holes 72 in the inner faces of the head members, and these pins extend into a pair of notches in the ends of the body sleeve 14 to positively locate the head assemblies to prevent radial slippage between the head assemblies and the body sleeve 14.

When the head members 40 are tightened against the ends of the body sleeve 14, there is a small clearance between the heads 40 and the annular portions of the end plates 46 disposed outwardly of the locating flanges 60. As a consequence the end plates function as pressure relief valves by flexing away from the annular edges 66 of the body sleeve 14. The metal-to-metal contact areas between the ends of the body sleeve 14 and the heads 40 do not provide a hermetic seal, wherefor hydraulic fluid passing the seal between the end plates and the body sleeve may escape to the ambient. If desired, the end plates 46 may be formed of plastic or of another low yield strength material, such as aluminum and brass.

The rotary motor 10 may be seen to be more easily repaired than the prior art rotary motors, and worn or damaged parts may be readily replaced. The seperate end plate for the head assembly enables the use of roller or ball bearing thrust bearings and provides for a durable metal-to-metal seal between the body sleeve and the head assemblies. Moreover, designing the head assembly so that the end plate 46 contacts the annular edge 66 before the head 40 contacts the sleeve 14 enables the end plate to flex as the head assembly is tightened against the body sleeve and assures a good heremetic seal despite the use of normal dimensional tolerances. A flex of about 0.002 to 0.003 inch in a steel end plate 46 provides sufficient force at the edge 66 to assure a hermetic metal-to-metal seal. The use of other materials for the face plate 46 will require different amounts of flexing.

Figure 3:
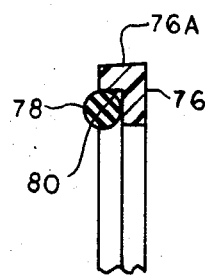
FIGS. 3, 4 and 5 are enlarged, fragmentary cross-sectional views of three different embodiments of a novel face seal used in the rotary actuator shown in FIG. 1.
Figure 7:
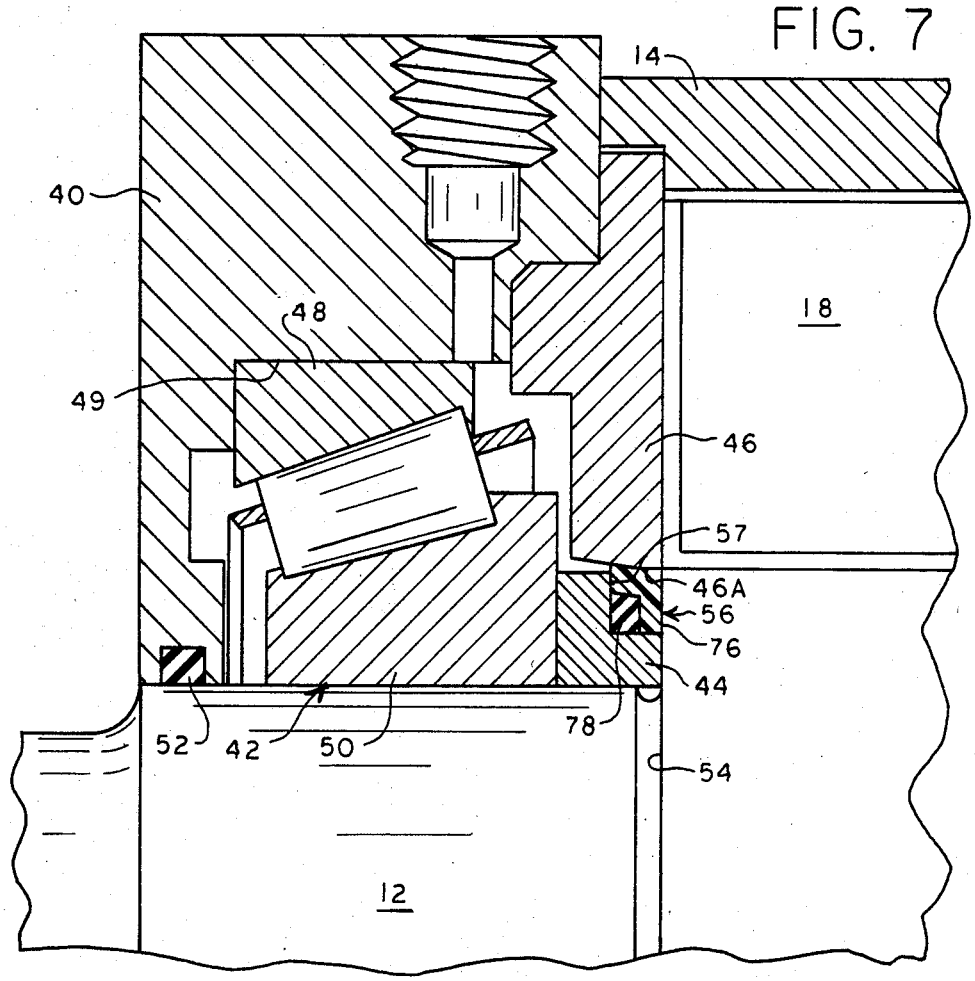
FIG. 7 is an enlarged, cross-sectional view of the novel face seal of the present invention.

Referring particularly to FIG. 7 the gasket assembly 56 may be seen to comprise an annular sealing ring 76 formed of a low friction, low memory, non-resilient material such, for example, as tetrofluoroethylene, and an annular resilient ring 78 formed of rubber or other suitable elastomeric material. Prior to assembly, and as best shown in FIG. 3, the ring 76 has a square-cornered groove 80 in which the ring 78 is disposed. The cross-sectional area of the ring 78 is greater than the cross-sectional area of the groove 80 so that when the gasket assembly 46 is forced into the groove 57 in the thrust bushing 44 during assembly of the rotary actuator 10 the ring 76 is extruded into the annular space between the thrust bushing 44 and the inner face 46A of the end plate 46. In this manner a close precision fit is provided between the mutually abutting surface of the ring 76 and the face plate 46 to prevent leakage of fluid therebetween. It will be understood that the compressive strength of the material of which the ring 76 is made must be exceeded during assembly to cause the necessary extrusion.

Figure 6:
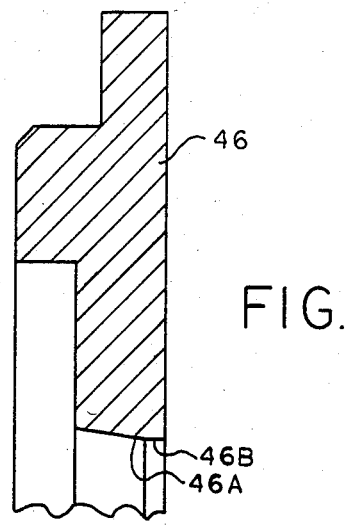
FIG. 6 is an enlarged, fragmentary cross-sectional view of the face plate used in the rotary actuator shown in FIG. 1.

In order to assure that the ring 76 will not be extruded between the face 46A and the outer edge of the shoulder 54 on the rotor 12, the face 46A is tapered, as shown in FIG. 6, and initially, the outer surface 76A of the ring 76 is tapered to provide a space which is V-shaped in cross-section and which diverges away from the shoulder 54. It is not always necessary to provide a taper on the seal ring 76 itself. I have found that a three degree taper on the face 46A of the face plate prevents the undesirable extrusion of the ring 76 past the shoulder 54 where it would cut into and otherwise damage the rubber gaskets 20 and 38.

Figure 4:
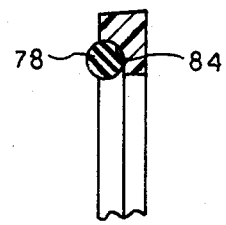
Figure 5:
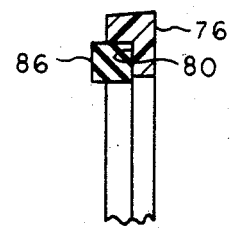

The particular cross-sectional shapes of the ring 78 and the groove 80 are not critical. For example, the square groove 80 may be replaced with an arcuate groove 84 as show in FIG. 4 to exert a greater force on the sealing ring 76 for use for example with pressures in the range of 250 p.s.i to 1500 p.s.i. Similarly, the ring 78 having a circular cross-sectional configuration may be replaced with a ring 86 having a rectangular cross-sectional configuration as shown in FIG. 5 to exert a still greater force on the sealing ring 76 for use, for example, with pressures in the range of 250 p.s.i. to 3000 p.s.i. Preferably, the face 46A has a short flat section adjacent the gasket assembly as shown at 46B in FIG. 6. Since this is the area where the greatest drag between the face plate 46 and the rotor assembly occurs, it should be made as short as possible.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A method of providing a fluid tight seal between a shaft and a housing in which it is journaled, comprising the steps of
providing a bushing on said shaft, said bushing having an outer annular surface disposed in spaced relation to an adjacent internal annular surface of said housing and having an annular groove facing said surface of said housing,
mounting in said groove an annular sealing member and an annular elastomeric member, said elastomeric member being disposed between a bottom of said groove and a bottom of said sealing member to exert an outward radial force on said sealing member when said elastomeric member is compressed, said sealing member extending outwardly from said groove, forcing said shaft in an axial direction into said housing to press said sealing member against said internal annular surface of said housing to exert on said sealing member an inwardly directed radial force greater than the compression strength of said sealing member thereby to extrude said sealing member outwardly of said groove into the space provided between said outer annular surface of said bushing and said adjacent surface of said housing to provide a rotary seal between said sealing member and said housing.

2. A method according to claim 1 comprising the further step of providing the internal annular surface of said housing against which said sealing member is pressed with an outwardly divergent configuration.

3. In a fluid operated, reciprocatory rotary motor of the type having a body having a cylindrical bore therein, first and second head assemblies fixedly mounted to said body over the respective ends of said bore, a shaft extending through said bore and through said head assemblies, first and second annular thrust bearings respectively disposed in said first and second head assemblies, said shaft being journaled in said bearings, a radially disposed, longitudinal vane fixedly mounted to said shaft and extending from said first head assembly to said second head assembly, first sealing means carried by said body for sealing said shaft to said body and to said assemblies, second seal means carried by said vane for sealing said vane to said body and to said head assemblies, means for selectively admitting fluid under pressure into said bore to one side or the other of said vane, said first head assembly including a head member having a central bore and a counterbore through which said shaft extends, an annular thrust bushing compressed between an annular shoulder on said shaft and said first thrust bearing, said annular thrust bushing having an annular groove defining an outer wall surface, an annular end plate compressed between an annular end surface of said body and an annular facial surface on said head member, said annular end plate having a central bore defining an inner annular wall surface, said inner wall surface being disposed in spaced relation to the outer annular wall surface of said thrust bushing, an annular seal member formed of a rigid material having a low coefficient of surface friction and a low memory, an annular elastomeric member compressed between said seal member and said annular groove of said thrust bushing, and said seal member being forced by said elastomeric member into sealing engagement with the inner annular surface of said end plate and being extruded into the space provided between said inner annular surface and the outer annular wall surface of said thrust bushing.

4. A reciprocating motor according to claim 3 wherein said space provided between said inner annular surface of said end plate and the outer annular wall surface of said thrust bushing is increasing in a direction away from said body.

5. A reciprocatory motor according to claim 4 wherein said inner annular surface of said end plate is frusto-conical.

* * * * *